May 8, 1928.

L. C. COLE 1,668,948

WORK DRIVER FOR AXLE LATHES

Filed Oct. 13, 1926

INVENTOR
L.C.Cole
BY
Joseph K Schofield
ATTORNEY

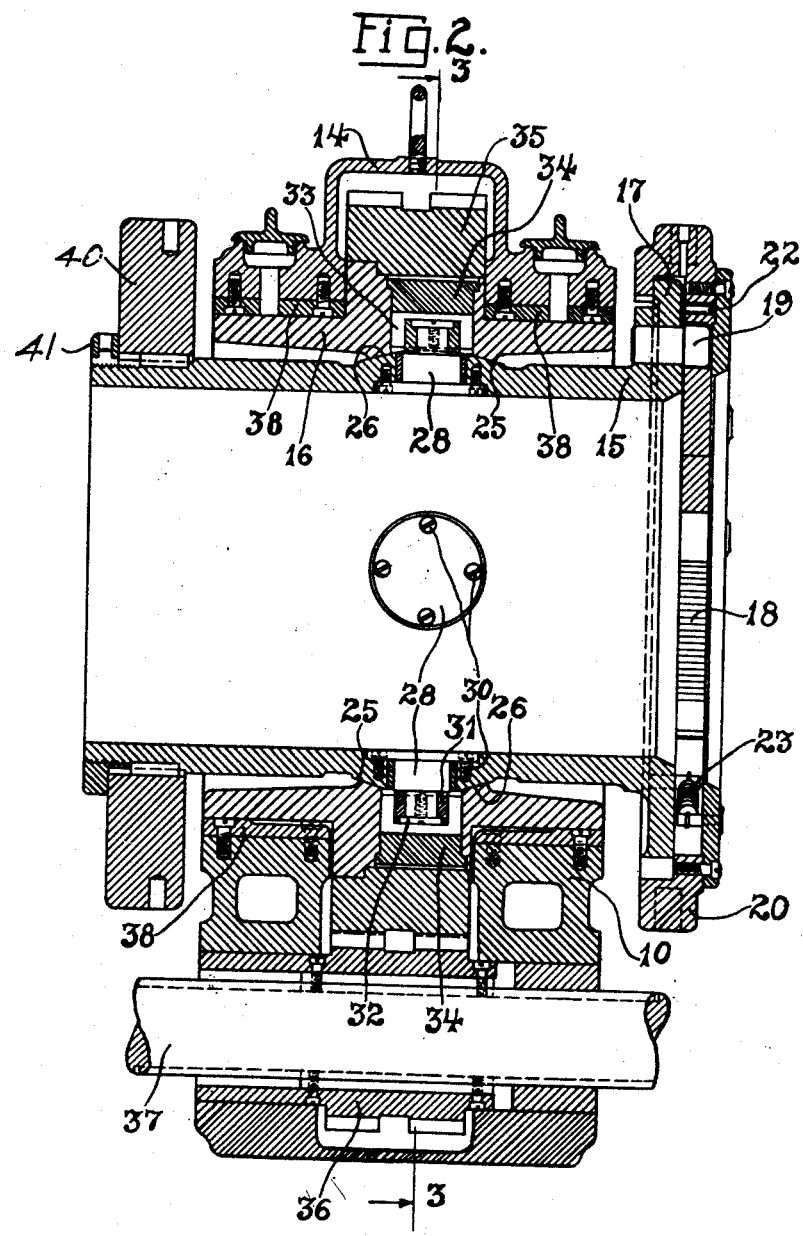

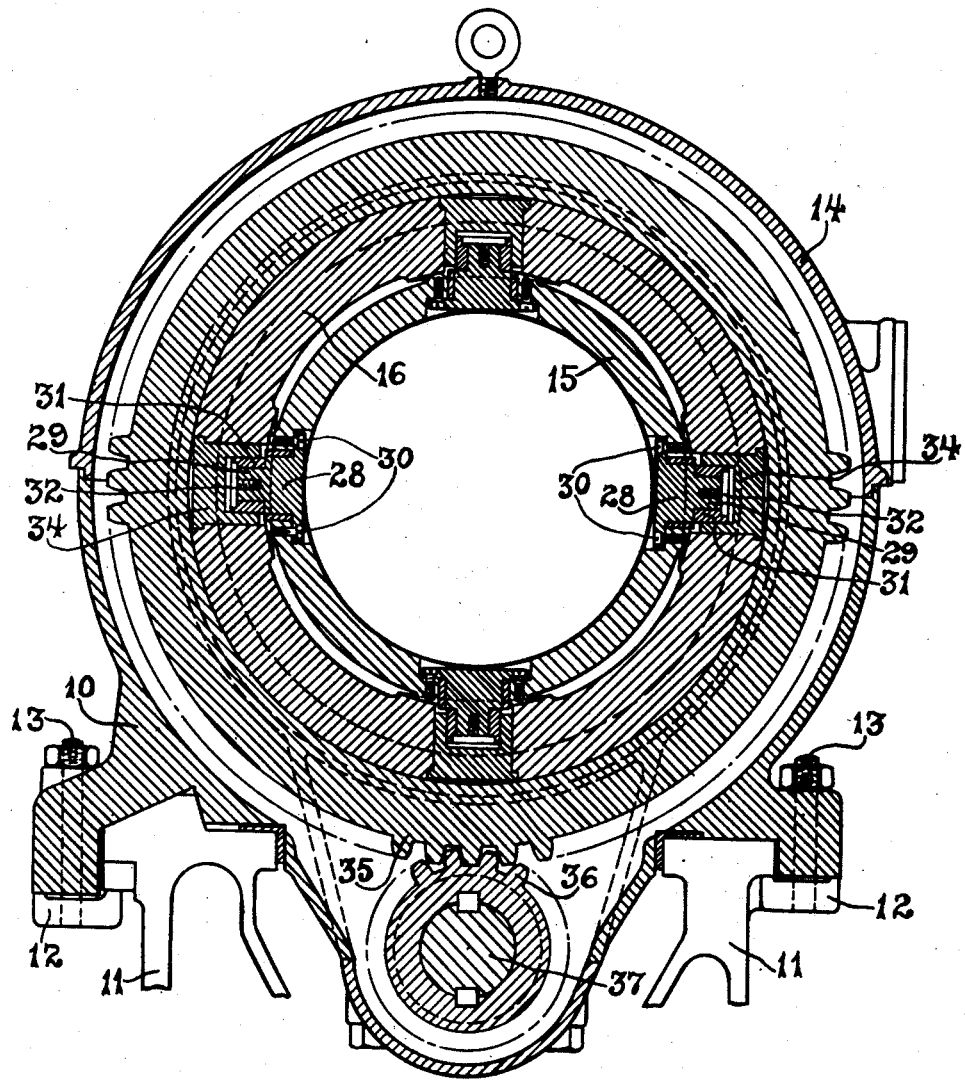

Patented May 8, 1928.

1,668,948

UNITED STATES PATENT OFFICE.

LYNDON C. COLE, OF HAMILTON, OHIO, ASSIGNOR TO NILES-BEMENT-POND COMPANY, OF NEW YORK, N. Y., A CORPORATION OF NEW JERSEY.

WORK DRIVER FOR AXLE LATHES.

Application filed October 13, 1926. Serial No. 141,391.

This invention relates to axle lathes and particularly to a central driving member for rotating the axle while mounted for cutting operations upon centers on a lathe.

An object of the invention is to provide an improved form of driving head for axles, or other work to be turned, having a sleeve provided with work engaging jaws adapted to grip and rotate the axle or other work being turned.

Another object of the invention is to provide a spherical bearing for the sleeve carrying the work gripping jaws within a member or head adapting the sleeve to be rotated while it is free to oscillate in any direction during rotation about the center of the spherical bearing.

Another object of the invention is to provide work engaging jaws on the oscillatory sleeve pivotally mounted and adapted to be simultaneously movable into and out of gripping engagement with the work.

A further object of the invention is to provide counterbalancing means on the sleeve adapted to balance the weight of the jaws and their actuating means.

Another object of the invention is to provide driving means for the sleeve comprising a member rotatable within fixed bearings and having a gear on its outer periphery, this member having recesses extending axially of the member and spaced about the inner surface thereof, these recesses being adapted to be engaged by cylindrical trunnions outstanding radially from the sleeve.

With these and other objects in view, my invention consists in the features of construction and operation set forth in the following specification and illustrated in the accompanying drawings.

In the accompanying drawings annexed hereto and forming a part of this specification I have shown my invention embodied in a driving head particularly adapted for axle lathes but it will be understood that the invention can be otherwise embodied and that the drawings are not to be construed as defining or limiting the scope of the invention, the claims appended to this specification being relied upon for that purpose.

In the drawings:

Fig. 2 is a longitudinal sectional view of the complete driving head, and

Fig. 3 is a section taken substantially upon line 3—3 of Fig. 2.

Figure 1:
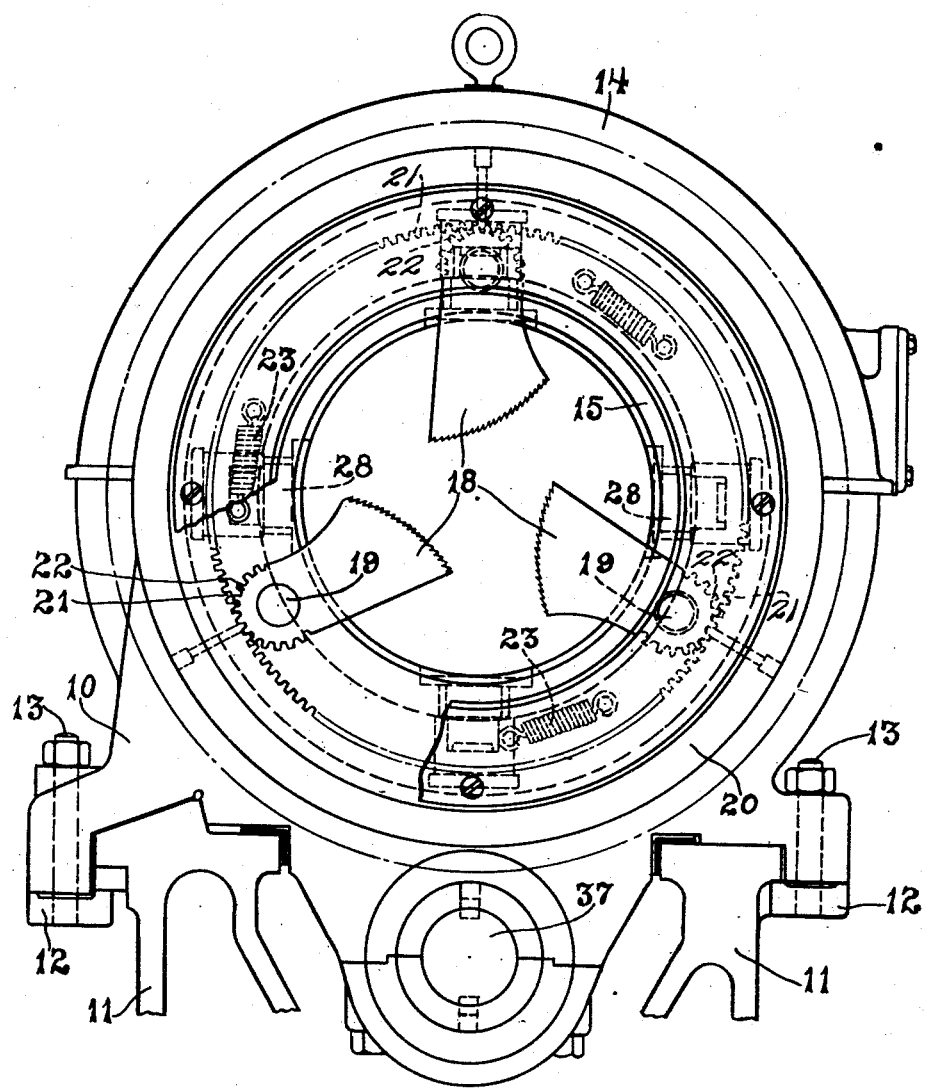
Figure 1 is a side view of the complete head showing the work engaging jaws in their operative or work engaging positions.

In the above mentioned drawings I have shown but one embodiment of the invention which is now deemed preferable, but it is to be understood that changes and modifications may be made within the scope of the appended claims without departing from the spirit of the invention.

Briefly, and in its broadest aspect, my invention comprises the following principal parts: first, a base member adapted to be positioned adjustably along the ways of a lathe and clamped thereto in any adjusted position; second, a rotatable driving member within this base member; third, a sleeve mounted within this driving member for rotation therewith; fourth, pivotally mounted jaws on said sleeve, preferably three being used; fifth, a ring surrounding a flange on the sleeve and having engaging means with each of the jaws so that these jaws may be simultaneously moved into or out of operative position by rotation of the ring relative to the sleeve; sixth, spring means acting upon this ring to normally and resiliently force the pivotally mounted jaws toward their work engaging position; seventh, a spherical bearing on the sleeve engaging a correspondingly formed bearing on a rotatable driving member for the sleeve; eighth, trunnions secured within the sleeve and outstanding therefrom; ninth, longitudinally extending recesses formed within the rotatable driving member adapted to receive the trunnions on the sleeve; and tenth, bearings for the rotatable driving member formed in the base member and adapted to rotate this driving member about an axis in alignment with the lathe ways.

Referring more in detail to the figures of the drawings, I provide a base member 10 adapted to rest upon and be adjusted along the ways 11 on the bed of a lathe. Clamping strips 12 engaged by suitable bolts 13 are provided for securing this base member 10 in any desired adjustable position along the bed. Preferably and as shown in the drawings, this base member 10 is formed in two parts, the lower half of which is adapted to be secured directly to the lathe bed as above described and the upper half 14 is adapted to be secured to the lower half at its upper horizontal surface. Within a central opening formed by these two half members 10 and 14 of the base member is a sleeve 15 supported within a driving member 16 which is adapted to be rotated by means presently to be described.

One end of this sleeve 15 is formed with an outstanding flange 17 to which are pivotally mounted work gripping jaws 18, three of these preferably being provided each having serrations upon their inner cam shaped ends. In order to oscillate these work engaging jaws 18 about studs 19 fixed within the flange 17 and forming pivots therefor, a ring 20 is mounted for rotation about the flange 17 provided with teeth 21 upon its inner annular surface. The teeth 21 of this ring member 20 engage teeth 22 of segmental gears formed integrally with the work engaging jaws 18 adjacent the pivots 19. It will be seen, therefore, that slight rotation of this ring 20 relative to the sleeve 15 will simultaneously oscillate the gripping jaws 18 to move them toward or away from their operative or work engaging position. Preferably springs 23 are provided attached at one end to the sleeve 15 and having their other ends attached to the ring 20 so that normally the jaws 18 are resiliently forced toward their operative or work gripping positions.

In order to permit oscillatory movement of the sleeve 15 during its rotation so that the sleeve 15 may oscillate to accommodate itself for variations in the eccentricity of the work, the sleeve 15 is provided with spherical bearing surfaces 25 approximately midway of its length, which surfaces are adapted to be in engagement with corresponding spherical surfaces 26 on the inside surface of the driving and supporting member 16. As shown clearly in Fig. 3, the spherical surfaces 25 and 26 on the sleeve 15 and driving member 16 are disposed at spaced positions about these members. Between these portions of spherical bearing surfaces the sleeve 15 and driving member 16 are cut away sufficiently to permit assembling these parts of the construction in operative position. These cut away portions of the sleeve 15 and driving member 16 are shown in Fig. 3.

In order to drive the sleeve from this rotatable driving member 16 with the sleeve 15 oscillated to any oblique position, trunnions 28 are positioned within the sleeve 15 having cylindrical portions 29 outstanding radially therefrom. These trunnions 28 are adapted to be securely fixed to the sleeve 15 as by screws 30. The cylindrical extended portions 29 of these trunnions 28 are provided with freely rotatable rollers 31 held in position by means of screws 32 having enlarged heads fitting over the ends of the rollers. The ends 29 of trunnions 28 are adapted when in operative position to be positioned within longitudinally formed recesses 33 formed in plug members 34 inserted in the driving and supporting member 16. It will be seen from this construction that rotation of the driving and supporting member 16 will drive the sleeve 15 in any oblique position which it may assume.

In order to rotate the driving member 16 it is provided with a gear 35 centrally disposed and fixed thereon which is adapted to be engaged by a pinion 36 splined to a driving shaft 37 suitably supported within the lower portion of the base member 10.

To support the driving member 16 rotatably within the base member 10, bearings 38 are formed within the upper and lower halves 10 and 14 of the base member adapted to contact with the driving member 16 on opposite sides of the driving gear 35.

To maintain the sleeve 15 balanced so that it will normally tend to rotate upon a horizontal axis, and to prevent the weight of the jaws 18 and ring 20 from tilting the sleeve 15 downward, a counterweight 40 is provided. This counterweight 40 is keyed to the sleeve 15 as shown in Fig. 2. To retain the counterweight 40 in position on the sleeve 15, a locking ring 41 is threaded over the end of the sleeve 15 to a position contacting with the outer face of the counterweight.

What I claim is:

1. A driving head for axle lathes comprising in combination, a base member adapted to be positioned on a lathe bed, a driving member rotatable upon a fixed axis within said base member, a sleeve mounted within said driving member and drivingly connected thereto, work engaging means on said sleeve, a fragmentary spherical surface on said sleeve in engagement with a corresponding surface on said driving and supporting member whereby said sleeve may be rotated while obliquely disposed, and rotating means for said driving member.

2. A driving head for axle lathes comprising in combination, a base member adapted to be positioned on a lathe bed, a driving member rotatable upon a fixed axis within said base member, a sleeve mounted within said driving and supporting member, work engaging means on said sleeve, spherical surfaces on said sleeve in engagement with corresponding surfaces on said driving member whereby said sleeve may be rotated while obliquely disposed, driving connections between said sleeve and driving member, and rotating means for said driving and supporting member.

3. A driving head for axle lathes comprising in combination, a base member adapted to be positioned on a lathe bed, a sleeve rotatably mounted within said base member, work engaging jaws on one end of said sleeve, trunnions oppositely disposed and outwardly extending from said sleeve, a driving member rotatable within said base member surrounding said sleeve and having members engaging said trunnions, rotating means for said driving member, and a spherical bearing for said sleeve within said driving member.

4. A driving head for axle lathes comprising in combination, a base member adapted to be positioned on a lathe bed, a sleeve rotatably mounted within said base member, work engaging jaws on said sleeve, trunnions oppositely disposed and outwardly extending from said sleeve, a driving member rotatable within said base member and surrounding said sleeve, members on said driving member having longitudinally extending recesses engaging said trunnions, and rotating means for said driving member.

5. A driving head for axle lathes comprising in combination, a base member adapted to be positioned on a lathe bed, a sleeve rotatably mounted within said base member, work engaging jaws on said sleeve, trunnions oppositely disposed and outwardly extending from said sleeve, a driving member rotatable upon a fixed axis within said base member and surrounding said sleeve, means on said driving member engaging said trunnions to drive said sleeve, and rotating means for said driving member.

6. A driving head for axle lathes comprising in combination, a base member adapted to be positioned on a lathe bed, a sleeve rotatably mounted within said base member, work engaging jaws on said sleeve, trunnions oppositely disposed and outwardly extending from said sleeve, a driving member rotatable within said base member and surrounding said sleeve, members on said driving member having longitudinally extending recesses engaging said trunnions, rotating means for said driving member, and a spherical bearing for said sleeve within said driving member.

7. A driving head for axle lathes comprising in combination, a base member adapted to be positioned on a lathe bed, a sleeve rotatably mounted within said base, work engaging jaws pivotally mounted on said sleeve, a driving and supporting member within the base member and surrounding said sleeve, a driving gear fixed to said driving and supporting member, interengaging means connecting said sleeve and driving member whereby said sleeve may be rotated while free to adjust itself relative to the work, and driving means for said driving ring.

8. A driving head for axle lathes comprising in combination, a base member adapted to be positioned on a lathe bed, a sleeve rotatably mounted within said base, work engaging jaws pivotally mounted on said sleeve, a driving and supporting member rotatable within the base member upon a fixed axis and surrounding said sleeve, a driving gear fixed to said driving and supporting member, interengaging means connecting said sleeve and driving member whereby said sleeve may be rotated while free to adjust itself relative to the work, spherical bearing surfaces upon said sleeve and driving member, and driving means for said driving ring.

9. A driving head for axle lathes comprising in combination, a base member adapted to be positioned on a lathe bed, a driving member rotatable upon a fixed axis within said base member, a sleeve mounted within said driving member and adapted to be rotated thereby, work engaging means on said sleeve, a counterweight on said sleeve adapted to balance the work engaging means, a fragmentary spherical surface on said sleeve in engagement with a corresponding surface on said driving and supporting member whereby said sleeve may be rotated while obliquely disposed, and rotating means for said driving member.

10. A driving head for axle lathes comprising in combination, a base member adapted to be positioned on a lathe bed, a driving member rotatable upon a fixed axis within said base member, a sleeve mounted within said driving and supporting member and adapted to be driven therefrom, work engaging means at one end of said sleeve, counterbalancing means on the opposite end of said sleeve, a fragmentary spherical surface on said sleeve in engagement with a corresponding surface on said driving member whereby said sleeve may be rotated while obliquely disposed, and rotating means for said driving and supporting member.

11. A driving head for axle lathes comprising in combination, a base member adapted to be positioned on a lathe bed, a sleeve rotatably mounted within said base member, work engaging jaws on one end of said sleeve, means on the opposite end of said sleeve to counterbalance said jaws and their actuating means, trunnions oppositely disposed and outwardly extending from said sleeve, a driving member rotatable within said base member surrounding said sleeve and having members engaging said trunnions, rotating means for said driving member, and a spherical bearing for said sleeve within said driving member.

In testimony whereof, I hereto affix my signature.

LYNDON C. COLE.